United States Patent [19]
Kisor et al.

[11] Patent Number: 5,978,847
[45] Date of Patent: *Nov. 2, 1999

[54] ATTRIBUTE PRE-FETCH OF WEB PAGES

[75] Inventors: Gregory H. Kisor, Beaverton; Kenneth W. Reese, Portland, both of Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/773,070

[22] Filed: Dec. 26, 1996

[51] Int. Cl.⁶ .............................. G06F 13/38; G06F 17/30
[52] U.S. Cl. ............................................ 709/227; 709/226
[58] Field of Search ............................ 235/467; 707/104, 707/2, 3, 4, 500, 540; 395/200.48, 200.49, 200.47, 680, 500, 200.03, 200.36; 348/13; 364/280.4, 280.6, 282.4

[56] References Cited

U.S. PATENT DOCUMENTS

| | | | |
|---|---|---|---|
| 5,530,852 | 6/1996 | Mesker, Jr. et al. | 395/200.36 |
| 5,706,507 | 1/1998 | Schloss | 707/104 |
| 5,715,453 | 2/1998 | Steward | 707/104 |
| 5,721,827 | 2/1998 | Logan | 395/200.47 |
| 5,721,897 | 2/1998 | Rubinstein | 707/2 |
| 5,727,156 | 3/1998 | Herr-Hoyman et al. | 395/200.49 |
| 5,737,619 | 4/1998 | Judson | 707/500 |
| 5,742,042 | 4/1998 | Scofield | 235/467 |
| 5,742,768 | 4/1998 | Gennaro | 1/1 |
| 5,774,670 | 6/1998 | Montulli | 395/200.57 |
| 5,887,133 | 3/1999 | Brown | 707/540 |

OTHER PUBLICATIONS

Ian S, Graham, HTML sourcebook : a complete guide to HTML 3.0, John Wiley & Sons, Inc., 688 pages 01/26/1996.

*Primary Examiner*—Ahmad F. Matar
*Assistant Examiner*—Khanh Quang Dinh
*Attorney, Agent, or Firm*—Blakely, Sokoloff, Taylor & Zafman LLP

[57] ABSTRACT

The present invention relates to an electronic system and its corresponding method of determining the attributes of a Web page without downloading the Web page. The electronic system includes a first electronic system and a second electronic system. In the second electronic system, a keyword describing the contents of the Web page is added to a file. The first electronic system transmits a request to the second electronic system for the file. The second electronic system transmits the file to the first electronic system, where, based on the keyword, it is determined whether to download the Web page.

30 Claims, 6 Drawing Sheets

FIG. 3

```
202 — HTTP/1.0
204 — Server: Microsoft-IIS/2.0
208 — Attribute-list: A1, A2, A3
         └──210──┘  └──212──┘
206 — Last Modified: Fri, 18 oct 1996 22:22:52 GMT
```

```
214 — HEAD  /Path/webpage.html  HTTP/1.0
      └216┘ └──────218──────┘  └──220──┘
```

```
       ┌─  HTTP/1.0 200 OK
       │   Server: Microsoft-IIS/2.0
  230 ─┤   Date: Thu, 24 oct 1996 14:51:29 GMT
  232 ─┤   Content-Type: text/html
224 ┤ 234 ─┤ Attribute-list: A1, A2, A3
       │            └──236──┘ └─238─┘
  240 ─┤   Last Modified: Fri, 18 oct 1996 22:22:52 GMT
       └─  Content-length: 1013
226 {      <CR><LF>
           <HTML>
           ...
           ...
228 {      ...
           ...
           ...
           </HTML>
```

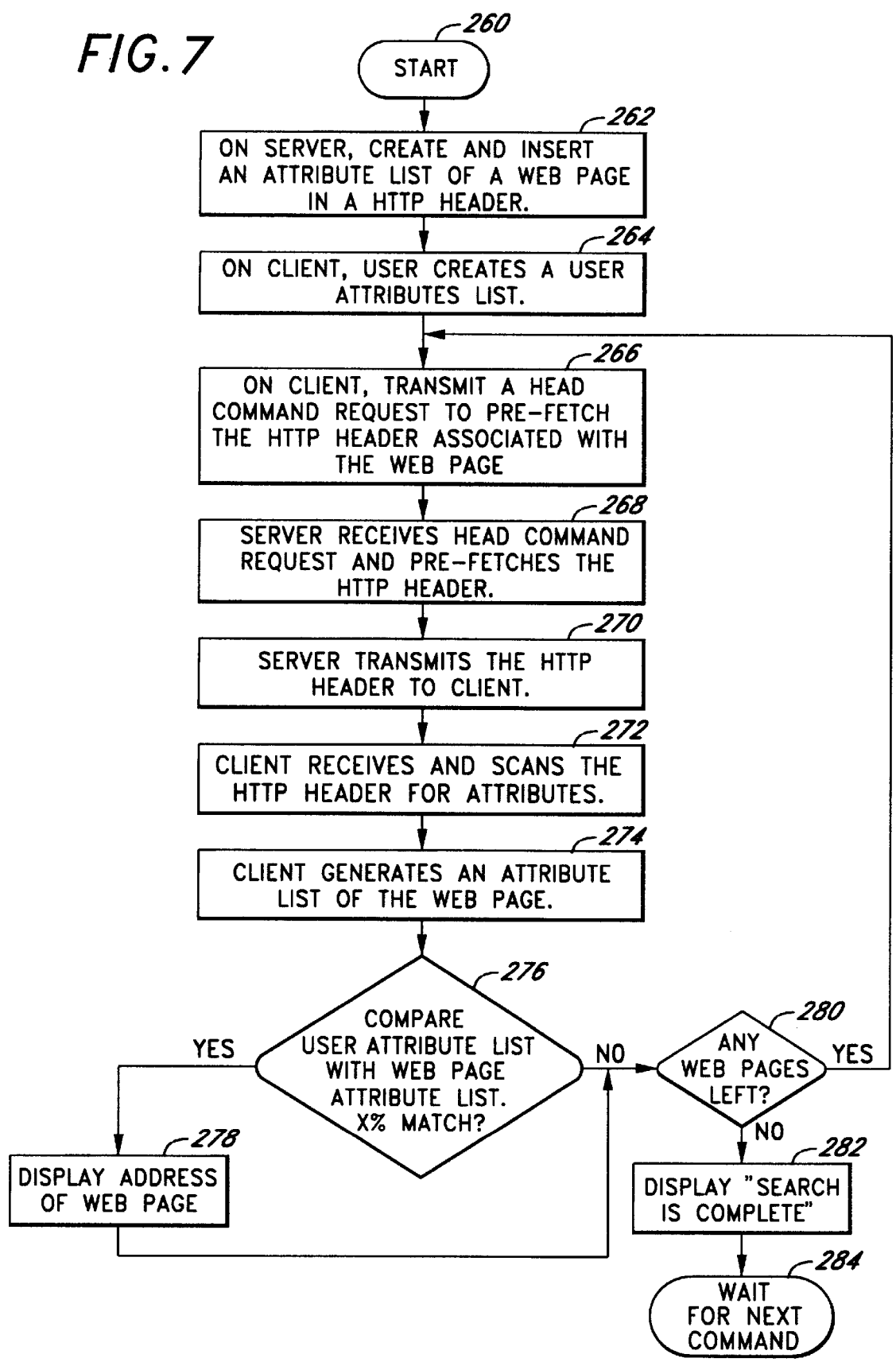

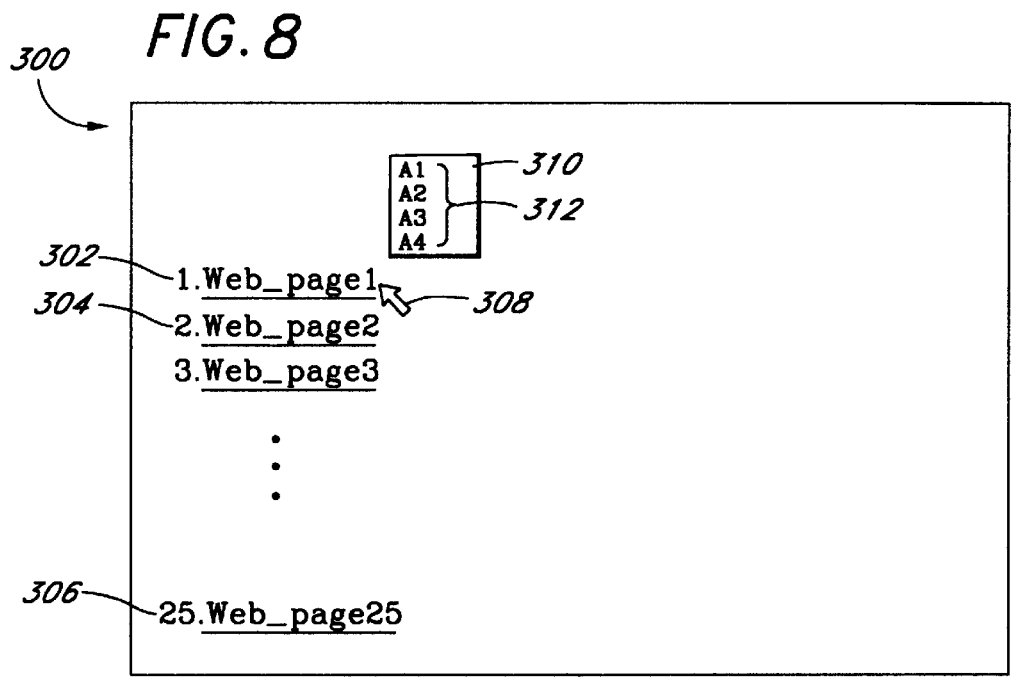
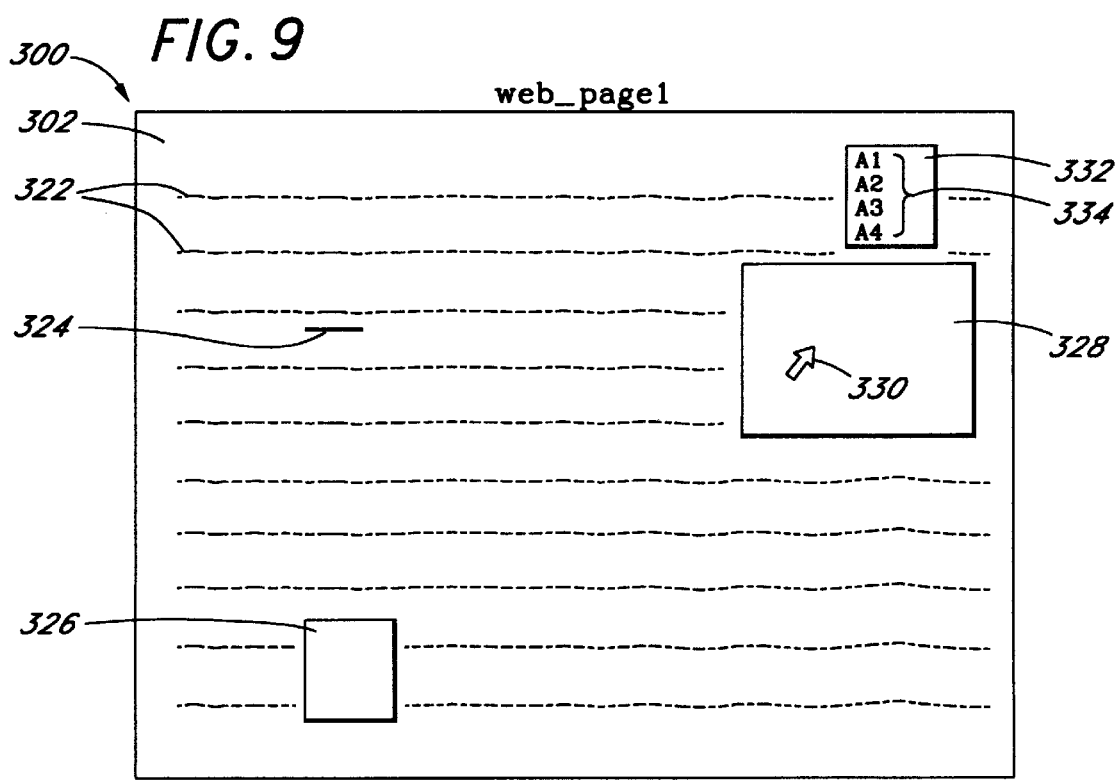

ATTRIBUTE PRE-FETCH OF WEB PAGES

BACKGROUND OF THE INVENTION

1. Field of the Invention

The present invention relates generally to a system and method of classifying and retrieving the attributes of Web pages. More particularly, the present invention relates to pre-fetching a HyperText Transfer Protocol ("HTTP") header of a Web page and scanning for attributes embedded in the HTTP header.

2. Description of Related Art

Today, a user searching for Web pages on a particular topic inputs keywords into a search engine (such as ALTA VISTA™ or YAHOO™) which searches for possible Web pages that contain the keywords. The search engine then "crawls" through every link and Web page that it can find and retrieves data that matches the keywords. The search engine then classifies and organizes the Web pages according to the raw number of times that the keywords appear in each Web page. That is, the search engine creates a massive database that keeps track of the number of times that each keyword occurred.

Over the last few years, it has been discovered that the current method of searching for Web pages has certain disadvantages. One disadvantage is narrowing down the retrieved data that is meaningful to a user. For example, this may occur when a user searching for "scholarships" (e.g., educational) finds a Web page containing a personal resume containing the word "scholarship". In addition, an increasing number of Web pages are rigged with hidden text. Thus, a Web page on the surface may appear meaningful to the user, but in reality is not pertinent. This defeats the whole organization of the Internet, especially when an increasing number of people are selling the content of Web pages for money.

Another disadvantage associated with the current method of searching for keywords in Web pages is the amount of time that it takes to search every Web page. A Web page may also take a long time to download since it typically contains, among other things, textual content, embedded graphics, and tables. This is especially annoying when a Web page that is downloaded does not pertain to the user's topic of interest.

Therefore, there is a need for a better way to classify and index the contents of a Web page such that the classification more accurately reflects the contents of the Web page and to retrieve the classification much faster than any other method used today.

SUMMARY OF THE INVENTION

The present invention relates to an electronic system and its corresponding method of determining the attributes of a Web page without downloading the Web page. The electronic system includes a first electronic system and a second electronic system. In the second electronic system, a keyword describing the contents of the Web page is added to a file. The first electronic system transmits a request to the second electronic system for the file. The second electronic system transmits the file to the first electronic system, where, based on the keyword, it is determined whether to download the Web page.

BRIEF DESCRIPTION OF THE DRAWINGS

FIG. 3 illustrates a typical HTTP header of a Web page incorporating an attribute field according to one embodiment of the present invention.

FIG. 4 illustrates a typical HEAD command request which is transmitted from a client electronic system to a server electronic system.

FIG. 5 illustrates a typical response message to a GET command request transmitted from a server electronic system to a client electronic system.

FIG. 7 is a flow diagram illustrating another method of classifying and retrieving the attributes of a Web page implemented in the electronic system of FIG. 1.

FIG. 8 illustrates a method of displaying the search results of FIG. 7.

FIG. 9 illustrates a method of displaying a Web page in the enhanced browser of the present invention.

DESCRIPTION OF THE PREFERRED EMBODIMENT

The present invention is an electronic system and method of classifying and indexing the contents of a Web page and retrieving the classification of the Web page in a fraction of the time, using existing mechanisms and protocols. As discussed herein, an "electronic system" is a product including circuitry capable of processing data. The electronic system may include, but is not limited to, a computer (e.g., laptop, desktop, server, mainframe, etc.), hard copy equipment (e.g., printer, plotter, fax machine, etc.), banking equipment (e.g., an automated teller machine), and the like. Moreover, a "memory element" is a device that stores a program. The memory element may include, but is not limited to, a storage disk (e.g., hard, floppy, compact, optical, etc.) Random Access Memory ("RAM"), Read Only Memory ("ROM"), non-volatile RAM, zip memory, and the like. In addition, a "communication link" refers to the channel of communication. The communication link may include, but is not limited to, a telephone line, a satellite connection, an Integrated Services Digital Network ("ISDN") line, an Ethernet connection, a coaxial connection, a fiber optic connection, and the like. Finally, as discussed herein, a Web page is a data file on a server electronic system (also known as a content site) that contains information.

Figure 1:
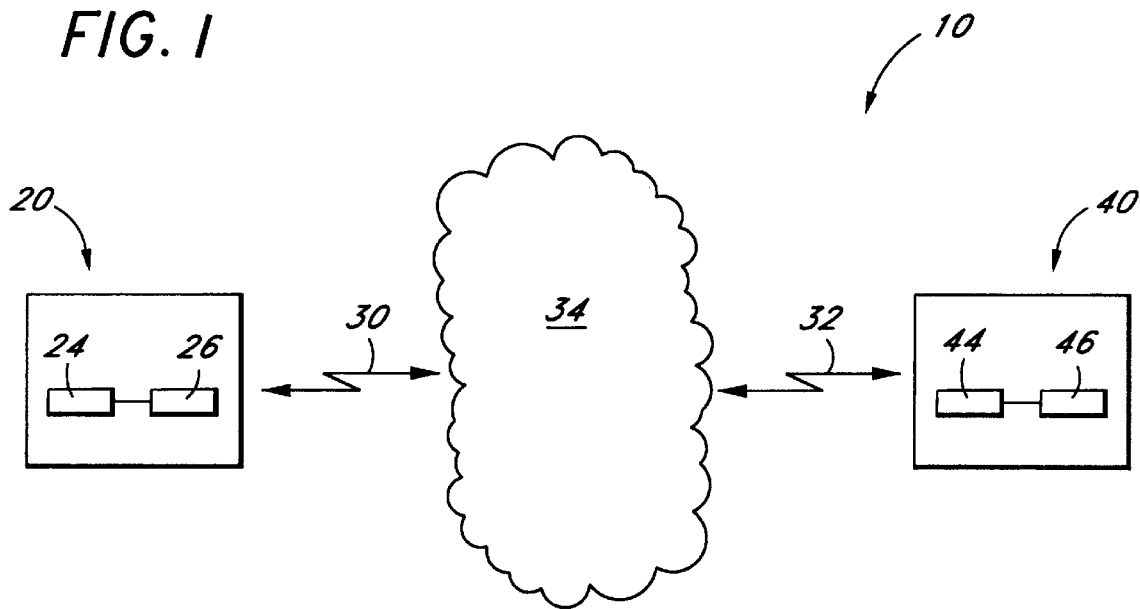
FIG. 1 illustrates one embodiment of an electronic system utilizing the present invention.

FIG. 1 illustrates one embodiment of an electronic system 10 utilizing the present invention. Referring to FIG. 1, the electronic system 10 includes a client electronic system 20, a server electronic system 40, and communication links 30 and 32 coupled to the network 34 (e.g., Internet). The communication links 30 and 32 couple the client electronic system 20 to the server electronic system 40 through the network 34. The client electronic system 20 includes a client memory element 24 coupled to a client processor 26 and server electronic system 40 includes a server memory element 44 coupled to a server processor 46. As discussed herein, a client electronic system is an electronic system that establishes connections for the purpose of transmitting requests and a server electronic system is an electronic system that accepts connections in order to service requests by transmitting responses. Moreover, a "client" is an application program that establishes connections for the purpose of sending requests and a "server" is an application program that accepts connections in order to service requests by sending back responses.

Figure 2:
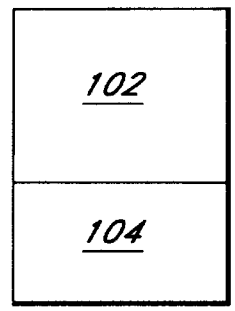
FIG. 2 illustrates an enhanced browser contained within the client memory element of FIG. 1.

FIG. 2 illustrates an enhanced browser 100 contained within client memory element 24 of FIG. 1. Client processor (not shown) executes the enhanced browser 100 contained within the client memory element (not shown). The enhanced browser 100 includes a browser 102 (e.g., Internet Explorer™, Netscape Navigator™, etc.) and a browser enhancement 104. Implemented in client electronic system 20 of FIG. 1, the browser enhancement 104, among other things, retrieves and processes the attributes of Web pages. In particular, the browser enhancement 104 pre-fetches HTTP headers and attribute pages (described below), scans for attributes, passes the results to browser 102 for display, and performs other operations. The browser enhancement 104 may be a module added to the browser 102 or a separate "plug in" agent or handler running in conjunction with the browser 102.

FIG. 3 illustrates a typical HTTP header 200 of a Web page incorporating an attribute field according to one embodiment of the present invention. HTTP header 200 includes field 202 which specifies the protocol and version that is supported, field 204 which specifies the type and version of the server, and field 206 which specifies the date that the Web page was last modified. In the preferred embodiment of the present invention, the HTTP header 200 further includes an attribute field 208. The attribute field 208 is created and either added, appended, inserted, or embedded into the HTTP header 200. This process is performed either manually or by an automated process on the server electronic system 40.

Attribute field 208 includes an identifier 210 followed by an attribute list 212. The identifier 210 identifies that an attribute list is to follow. The attribute list 212 is a list of at least one significant keyword or term that is descriptive of the contents of the Web page. For example, "A1, A2, A3" in the attribute list 212 may be "Intel, Microprocessor, 64-bit". Thus, when a user pre-fetches the HTTP header and scans for attributes, the user will know that the Web page is about 64-bit Intel microprocessors. The attribute list 212 may also include a short narrative describing the Web page, a list of embedded links (e.g., addresses of other Web pages) in the Web page, or any other information which intelligently describes the contents of the Web page. The size or length of the attribute list 212 is not fixed and typically varies depending on the size and contents of the Web page.

Today, HTTP header 200 is used to retrieve a time stamp to determine the Web page's time of last modification or to just test a Uniform Resource Locator ("URL") for validity. With the addition of the attribute field 208, the HTTP header 200 can be used to classify and index the contents of the Web page. That is, the attribute field 208 is analogous to a card catalog system used in libraries. Each Web page is classified and indexed in order to more accurately describe the contents of a Web page.

FIG. 4 illustrates a typical HEAD command request which is transmitted from a client to a server. The HEAD command request (or HEAD method request) is defined in the HTTP/1.0 specification and specifies to the server to only retrieve the header of a Web page. Referring to FIG. 4, the HEAD command request field 214 includes three sub-fields. The first sub-field 216 is the command HEAD which specifies to a server to retrieve only the header of a Web page and not the body. The second sub-field 218 specifies the location of the Web page. Finally, the third sub-field 220 specifies the protocol and version currently running on the client. In the HTTP/1.0 protocol, a GET command request (or GET method request) typically retrieves the entire Web page including the HTTP header and body, the body being the actual Web page. Therefore, a HEAD command request is similar to a GET command request except that the server only sends back the HTTP header.

FIG. 5 illustrates a typical response message to a GET command request transmitted from a server electronic system to a client electronic system. Referring to FIG. 5, the response message 222 to the GET command request includes a HTTP response header 224, a blank line 226, and a body 228 of the Web page. In addition to the protocol and version, server type, and date and time of last modification, the HTTP response header 224 includes field 230 which indicates the access date and time, field 232 which specifies the media type of the body 228 that is to follow, and field 240 which indicates the size of the body 228. It should be noted that the content type and subtype in FIG. 5 is text/html. Media types are discussed in Multipurpose Internet Mail Extensions ("MIME"), as defined by the Internet Engineering Task Force Document, Request For Comment ("RFC") 1521. The content type defines the body (text) and the subtype defines the format of the body. There are other media types that may be used in addition to or in lieu of text/html (e.g., image/jpeg).

The HTTP response header 224 is a typical response to the HEAD command request of FIG. 4. The HTTP response header 224 further includes the attribute field 234 which includes an identifier 236 and an attribute list 238. With the addition of the attribute field 234, the entire Web page is not downloaded or scanned for keywords. Rather, only the Web page header is downloaded and scanned for the attribute list of the Web page, which contains at least one keyword. As discussed above, the present invention creates a card catalog system that better classifies the contents of the Web page and allows a client to retrieve such information at a fraction of the time. By way of example, a client can index all of the Web pages of a corporation or entity by issuing HEAD command requests for each Web page within the corporation or entity and pre-fetching the headers of all of the Web pages. This allows a corporation to catalog all of its Web pages in a more intelligent way.

Figure 6:
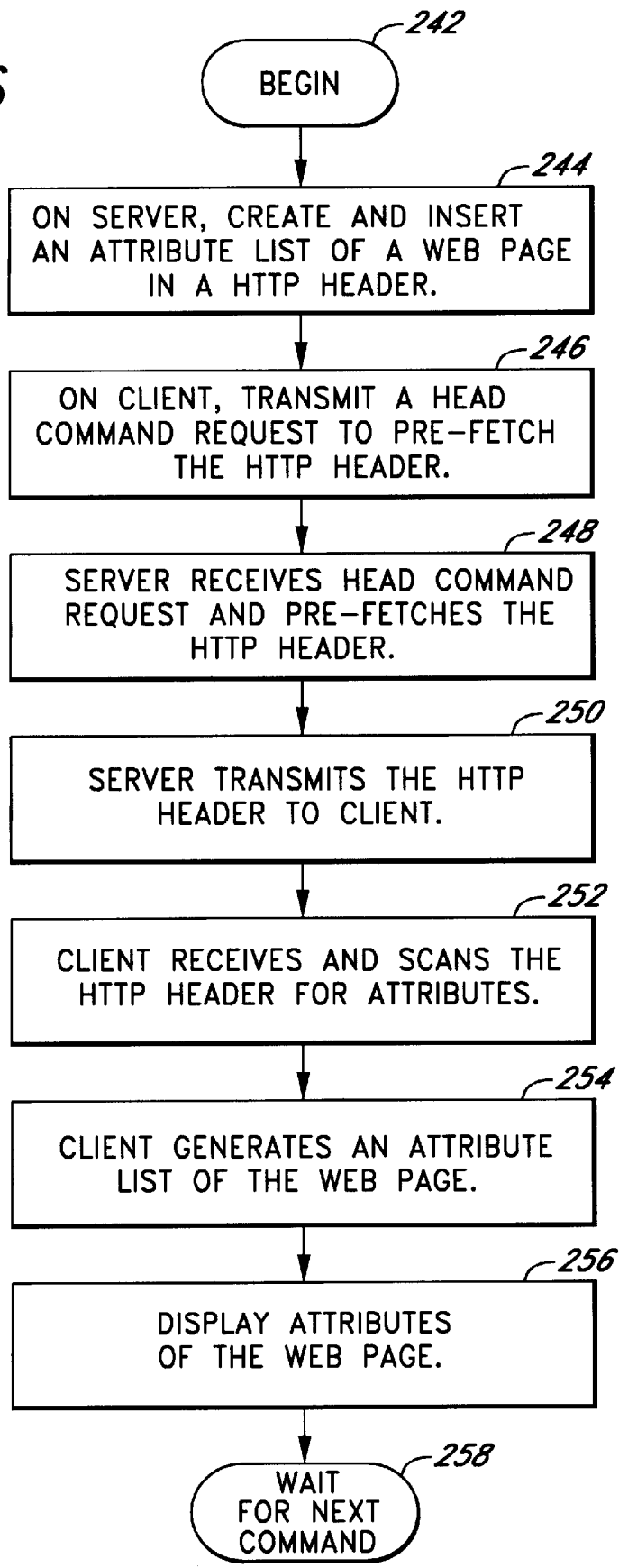
FIG. 6 is a flow diagram illustrating a method of classifying and retrieving the attributes of a Web page implemented in the electronic system of FIG. 1.

FIG. 6 is a flow diagram illustrating a method of classifying and retrieving the attributes of a Web page implemented in the electronic system of FIG. 1. At a server electronic system, an attribute list of a Web page is created and inserted in a HTTP header (Step 244), thus creating an enhanced HTTP header. As mentioned before, the creation and insertion of the attribute list into the HTTP header may be performed manually or could be automated. Continuing to refer to FIG. 6, a client transmits a HEAD command request to the server to pre-fetch the enhanced HTTP header of the Web page (Step 246). The server receives the HEAD command request and pre-fetches the enhanced HTTP header corresponding to the Web page (Step 248). The server then transmits the enhanced HTTP header to the client (Step 250). The client receives and scans the enhanced HTTP header for attributes and generates an attribute list of the Web page (Steps 252 and 254). Finally, the attribute list is displayed (e.g., on enhanced browser 100) on the client electronic system (Step 256). In addition, the URL of the Web page may also be displayed. Thus, if the user is interested in the contents of the Web page by viewing the attribute list, the user can click on the URL to download the Web page.

FIG. 7 is a flow diagram illustrating another method of classifying and retrieving the attributes of a Web page implemented in the electronic system of FIG. 1. In particular, FIG. 7 illustrates a method of automatically listing Web pages with attributes that match a user created attribute list. On a server electronic system, an attribute list of a Web page is created and inserted in a HTTP header (Step 262), thus creating an enhanced HTTP header. On a client electronic system, a user creates a user attribute list (Step 264). The user attribute list can be as simple as list of significant keywords on a topic that the user is a interested in researching. It is immaterial to the present invention that the user attribute list is created before or after the attribute list of the Web page is created and inserted into the HTTP header. The client transmits a HEAD command request to pre-fetch the enhanced HTTP header associated with the Web page (Step 266). The server receives the HEAD command request and pre-fetches the enhanced HTTP header and transmits the enhanced HTTP header to the client (Steps 268 and 270). The client receives and scans the enhanced HTTP header for attributes and generates an attribute list of the Web page (Steps 272 and 274).

Alternatively, in lieu of steps 266 to 274, a matching server may be used instead of a client to find Web pages that match the user attribute list. In this method, the client transmits the user attribute list to a matching server. This is done by the use of a HTTP POST command (or method) request. The matching server then sends a HEAD command request to pre-fetch the HTTP header associated with a Web page. The server receives the HEAD command request and pre-fetches the HTTP header. The server transmits the HTTP header to the matching server, where the HTTP header is received and scanned for attributes. The matching server compares the user attribute list with the Web page attribute list as shown in Step 276. The method continues until there are no Web pages left (Step 280). Thereafter, the matching server transmits the HTTP headers and URLs of the Web pages that matched the user attribute list to the client for display or other processing.

Continuing to refer to FIG. 7, the user attribute list is compared to the attribute list of the Web page (Step 276). If there is a successful comparison (e.g., 50% match, 70% match, 100% match, etc.), the address of the Web page is displayed (Step 278). If there is not a successful comparison, it is determined whether the search is complete or whether there is another enhanced HTTP header of a Web page to pre-fetch (Step 280). If there is another enhanced HTTP header of a Web page to pre-fetch, the client transmits another HEAD command request to pre-fetch the HTOP header of the next Web page (Step 266). The process continues (Steps 266 to 280) until all HTTP headers are pre-fetched or the user aborts the process. When the search is complete, a "search complete" message is displayed (Step 282).

FIG. 8 illustrates a method of displaying the search results of FIG. 7. Referring to FIG. 8, an enhanced browser 300 is shown displaying the URLs of a plurality of Web pages that match the user attribute list. When cursor element 308 is positioned on top of Web_page1 302 or if Web_page1 is selected (e.g., by the use of a keyboard), an attribute window 310 pops up which displays the attribute list 312 of Web_page1. Similarly, if the cursor element 308 is positioned on top of any other Web page or if any other Web page is selected in enhanced browser 300, an attribute window pops up which displays the attribute list of that Web page. In an alternative embodiment, the attribute list can simply be listed after the URL of each Web page. Based on the attribute list 312 shown in pop up window 310, the user can click on or select Web_page1 for downloading. The advantage of the present invention is that it takes a fraction of the time to pre-fetch the HTTP headers of all of the Web pages in FIG. 8 than to search or download an entire Web page. More importantly, the user will have a better classification of the contents of Web pages.

FIG. 9 illustrates a method of displaying a Web page in the enhanced browser of the present invention. Enhanced browser 300 displays the Web_page1 302 selected in FIG. 8. Typically, Web_page1 302 includes text 322, embedded hypertext link 324, and embedded links 326 and 328. For example, embedded hypertext link 324 or embedded links 326 and 328 may be text, an image, or a sound clip. As enhanced browser 300 is retrieving Web_page1 302, it is also pre-fetching the HTTP headers of the embedded links 324, 326, and 328 in the background and transparent to the user. By way of example, when cursor element 330 is positioned on top of embedded link 328 or if embedded link 328 is selected, an attribute window 332 immediately pops up and displays the attribute list 334 of the embedded link 328.

By way of another example, the attribute list of an embedded link may be pre-fetched once the embedded link is selected. Thus, the addition of displaying the attribute list of an embedded link allows the user to make an intelligent decision as to whether to download the Web page of the embedded link. This is especially true when an embedded link does not provide for any information as to the contents of the embedded link Web page. Moreover, the additional time that it takes to pre-fetch the HTTP headers of embedded links in a Web page is insignificant and the user will almost never notice the difference. Finally, by pre-fetching the HTTP headers of embedded links in addition to downloading the Web page, the present invention maximizes the bandwidth of a connection to the Internet (or other network), which is especially important over a slow link such as a modem.

Figures 10, 11:
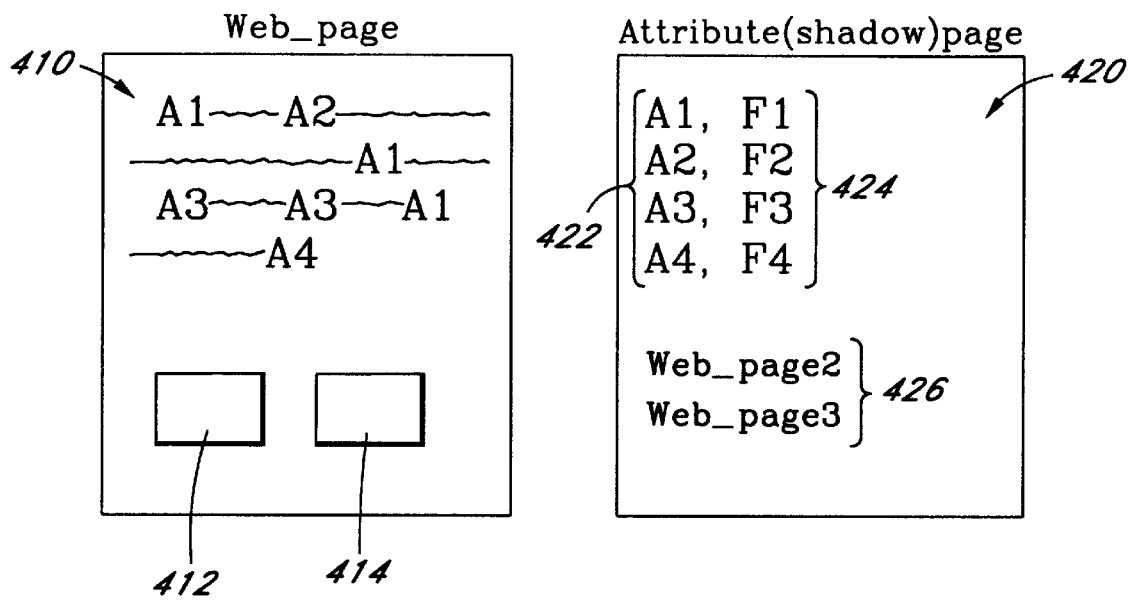
FIG. 10 illustrates a typical Web page and attribute page of the present invention.
FIG. 11 illustrates a GET command request transmitted form a client electronic system to a server electronic system in order to retrieve the attribute page of FIG. 10.

FIG. 10 illustrates an alternative method of providing the attributes of a Web page on a client. FIG. 10 shows a typical Web page 410 and an attribute page (or shadow page) 420 contained within server memory element 44 on server electronic system 40 of FIG. 1. The Web page 410 contains keywords A1, A2, A3, and A4 and embedded likes 412 and 414. In the preferred embodiment, the attribute page 420 includes an attribute list 422 (i.e., significant keywords of the Web page) and a frequency list 424 which specifies the frequency of occurrence of each keyword contained within the Web page 410. By way of example, the format of the attribute page 420 is the keyword A1 followed by the frequency count F1. In addition to or in lieu of either or both of the attribute list 422 and the frequency list 424, the attribute page 420 may include a list of URLs 426, specifying the addresses of the embedded links 412 and 414 in the Web page 410.

Attribute page 420 can be created manually by extracting keywords of the Web page 410, creating an attribute list, and inserting the attribute list in the attribute page 420. Alternatively, the steps listed above may also be automated or machine catalogued. In this alternative method, for every Web page that is created, an attribute page is also created and linked to the Web page. In this method, a client will transmit a request to a server for an attribute page instead of the header (which is untouched in this implementation) in order to retrieve the attributes of the Web page. This alternative method allows for more flexibility and complex cataloging of the attribute page that a client can post analyze.

However, before the client can request the attribute page 420, the attribute page must be assigned a content type and subtype. This allows the client to request only the content type and subtype rather than the HTTP header or Web page 410. The content type field describes the data contained in a Web page (either body or attribute page) such that the client can pick an appropriate agent or mechanism to present the data to the user, or deal with the data appropriately. The subtype field defines the format of the Web page. In addition to the seven content types defined by MIME (HTTP/1.0 uses many of the mechanisms defined for MIME), in one embodiment, a new type "Attribute" is created to identify and distinguish the attribute page from the Web page. Moreover, the subtype "plain" is used to specify the format of the attribute page. In an alternative embodiment, the existing content type "text" is used in conjunction with a new subtype called "Attribute" to define the data and format of the attribute page.

FIG. 11 illustrates a GET command request transmitted form a client to a server in order to retrieve the attribute page of FIG. 10. FIG. 11 includes a request field 430 and a request header field 432. The request field 430 is a GET command request which is define in the HTTP/1.0 specification and specifies to the server to retrieve whatever information is identified by the request header field 432. The request header field 432 includes an identifier 434 followed by a type/subtype sub-field 436 which indicates to the server a list of media ranges that are acceptable to the client as a response to the request. When the server receives the request field 430 and request header field 432, the server determines that the only acceptable media type is "text/Attribute" and will transmits the attribute page 420 of FIG. 10 rather than the Web page 410. In this alternative embodiment, the client does not have to scan for the attributes since the attribute page is the only thing that is returned. In addition to creating an attribute page 420, the client is enhanced to be able to issue the request field 430 and the request header field 432.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method of providing web page content information, comprising:
   pre-fetching attributes of a web page without downloading the web page by transmitting a request from a first electronic system to a second electronic system for downloading a header of a web page, said header including an attribute field indicative of the content of the web page;
   transmitting said header from said second electronic system to said first electronic system; and
   displaying said attribute field on said first electronic system.

2. The method of claim 1 wherein said header is a HTTP header of the web page.

3. The method of claim 2 wherein transmitting said request comprises transmitting a HEAD command request from said first electronic system to said second electronic system.

4. The method of claim 1 wherein said attribute field comprises one or more words.

5. The method of claim 1 further comprising determining whether to retrieve the web page from the second electronic system responsive to said attribute field.

6. The method of claim 4 further comprising:
   providing a user keyword at said first electronic system;
   comparing said user keyword with said one or more words of said attribute field; and
   displaying an address of the web page when said comparing said user keyword with said one or more words provides a successful comparison.

7. A method comprising:
   transmitting a user keyword from a first electronic system to a second electronic system;
   transmitting a request from said second electronic system to a third electronic system to retrieve a header of a web page without retrieving the web page itself, the header including an attribute field indicative of the contents of the web page;
   transmitting said header of the web page from said third electronic system to said second electronic system;
   comparing said user keyword with said attribute field; and
   transmitting an address of the web page from said second electronic system to said first electronic system when said comparing said user keyword with said attribute field provides a successful comparison.

8. The method of claim 7 further comprising transmitting said attribute field from said second electronic system to said first electronic system when said comparing said user keyword with said attribute field provides a successful comparison.

9. The method of claim 7 wherein said header is a HTTP header of the web page.

10. The method of claim 9 wherein transmitting said request comprises transmitting a HEAD command request from said second electronic system to said third electronic system.

11. The method of claim 7 further comprising displaying the address of the web page and one or more words of said attribute field on an output device on the first electronic system.

12. An article of manufacture, comprising:
   a computer usable medium having computer readable program code contained therein for causing a processor to determine at least one word that is indicative of a content of a web page;
   computer readable program code for causing the processor to add said at least one word to a header of the web page; and
   computer readable program code for causing the processor to transmit said header upon a request for said header without transmitting the web page.

13. The method of claim 12 wherein said header comprises a HTTP header of the web page.

14. The method of claim 13 wherein transmitting said HTTP header comprises transmitting said HTTP header upon receiving a HEAD command request.

15. An electronic system comprising:
   a communication link;
   a first electronic system coupled to said communication link, said first electronic system includes a memory element containing a header of a web page, said header includes an attribute field having one or more words indicative of a content of the web page, said first electronic system transmits said header without transmitting the web page in response to a request; and a second electronic system coupled to said communication link, said second electronic system transmits said request to said first electronic system to retrieve said header of the web page to display the one or more words on an output device.

16. The electronic system of claim 15 wherein said header comprises a HTTP header of the web page.

17. The electronic system of claim 16 wherein said request is a HEAD command request for said HTTP header of the web page.

18. A method of providing web page content information comprising:

transmitting a first request from a first electronic system to a second electronic system to download a first web page;

transmitting said first web page from said second electronic system to said first electronic system, said first web page having an embedded link of a second web page;

transmitting a second request from said first electronic system to a third electronic system to retrieve a header of said second web page without retrieving the second web page;

transmitting said header of said second web page from said third electronic system to said first electronic system, said header including an attribute field indicative of a content of said second web page; and displaying said attribute field.

19. The method of claim 18 wherein displaying said attribute field comprises displaying one or more words of said attribute field on an output device if said embedded link is selected.

20. The method of claim 18 wherein said header comprises a HTTP header of said second web page.

21. The method of claim 18 wherein said first request is a GET command request.

22. The method of claim 18 wherein said second request is a HEAD command request.

23. The method of claim 18 further comprising displaying said first web page.

24. The method of claim 18 wherein displaying said attribute field comprises displaying one or more words of said attribute field if a pointing device is placed substantially over the embedded link.

25. An article of manufacture, comprising:

a computer usable medium having computer readable program code contained therein for causing a processor to transmit a request to retrieve a header of a web page without retrieving the web page;

computer readable program code for causing the processor to receive said header of the web page, which includes an attribute field having one or more words indicative of a content of the web page;

computer readable program code for causing the processor to compare a user keyword with said one or more words; and computer readable program code for causing the processor to display an address of the web page if said user keyword and the one or more words provide a successful comparison.

26. The method of claim 11 wherein said header is a HTTP header of the web page.

27. The method of claim 26 wherein said request comprises a HEAD command request.

28. An apparatus, comprising:

a memory device including one or more instructions; and a processor coupled to said memory device, said processor in response to said one or more instructions to, transmit a first request to retrieve a first web page, receive said first web page, said first web page having an embedded link of a second web page, display said first web page, transmit a second request to retrieve a header of said second web page without retrieving said second web page, receive said header of said second web page, said header including an attribute field having one or more words indicative of a content of said second web page, and display said one or more words.

29. The method of claim 28 wherein said header is a HTTP header of the second web page.

30. The method of claim 29 wherein said first request comprises a GET command request and second request comprises a HEAD command request.

* * * * *

UNITED STATES PATENT AND TRADEMARK OFFICE
CERTIFICATE OF CORRECTION

PATENT NO.    : 5,978,847
DATED         : November 2, 1999
INVENTOR(S)   : Kisor et al.

It is certified that error appears in the above-identified patent and that said Letters Patent is hereby corrected as shown below:

<u>Column 6,</u>
Line 44, delete "likes", insert -- links --.

Signed and Sealed this

Sixth Day of May, 2003

JAMES E. ROGAN
*Director of the United States Patent and Trademark Office*